(12) United States Patent
Foye et al.

(10) Patent No.: US 6,177,963 B1
(45) Date of Patent: Jan. 23, 2001

(54) VIDEO SIGNAL DISTRIBUTION SYSTEM

(75) Inventors: Richard T. Foye, Fullerton; John B. Crosby, Yorba Linda, both of CA (US)

(73) Assignee: Multiplex Technology, Inc., Brea, CA (US)

( * ) Notice: Under 35 U.S.C. 154(b), the term of this patent shall be extended for 0 days.

(21) Appl. No.: 08/982,207

(22) Filed: Dec. 1, 1997

Related U.S. Application Data

(63) Continuation-in-part of application No. 08/635,727, filed on Apr. 22, 1996, now abandoned.

(51) Int. Cl.⁷ ............................. H04N 5/268; H04N 5/14; H04N 7/00
(52) U.S. Cl. .................................. 348/706; 348/3; 348/6; 348/8; 348/10; 348/552; 348/553; 348/706; 348/707; 348/724; 348/725; 455/6.2; 455/6.3; 455/3.2; 330/99; 330/100
(58) Field of Search ................................. 348/8, 10, 6.1, 348/3.1, 6, 553, 552, 724, 725, 707, 706; 455/6.3, 6.2, 3.2; 330/99–100

(56) References Cited

U.S. PATENT DOCUMENTS

| | | | |
|---|---|---|---|
| 4,808,992 | 2/1989 | Beyers, Jr. et al. | 340/825.24 |
| 4,885,803 * | 12/1989 | Hermann | 455/603 |
| 5,321,846 | 6/1994 | Yokota et al. | 455/4.2 |
| 5,594,509 | 1/1997 | Florin et al. | 380/10 |
| 5,640,453 | 6/1997 | Schuchman et al. | 380/10 |

\* cited by examiner

*Primary Examiner*—John K. Peng
*Assistant Examiner*—Brian P. Yenke
(74) *Attorney, Agent, or Firm*—Lynn & Lynn

(57) ABSTRACT

A video signal distribution system comprises an interface device and video signal input means for receiving TV signals on broadcast channels connected to the interface device. A plurality of video appliances and a plurality of TV sets may be connected to the interface device such that the television sets are arranged to be remote from the plurality of video appliances. A person using the system has a remote control device that may be actuated to emit signals for selecting channels for viewing and to control the video appliances. Each of the television sets includes a repeater arranged to receive the control signals from the remote control device and form corresponding electrical control signals. The interface device receives the electrical control signals corresponding to a selected TV set and directs electrical control signals to a selected one of the plurality of video appliances to provide video signals to the television sets.

5 Claims, 4 Drawing Sheets

VIDEO SIGNAL DISTRIBUTION SYSTEM

CROSS REFERENCE TO RELATED APPLICATION

This is a continuation-in-part of U.S. patent application Ser. No. 08/635,727 filed Apr. 22, 1996 for Home Video Signal Distribution System, now abandoned.

BACKGROUND OF THE INVENTION

This invention relates generally to video signal distribution systems. In particular, this invention relates to systems for distributing video signals from video signal sources to selected locations in a home and for controlling the video signal sources from any television set in the home. Still more particularly, this invention relates to systems for distributing throughout a home broadband signals from sources such as antennas or cables and locally created video signals from sources such as VCRs, videodisc players and satellite receivers.

Modern consumer electronics brings a wide array of video signal choices to the consumer. Video appliances such as VCRs, satellite receivers., and videodisc players are used to augment CATV or antenna service to a home. These video appliances usually connect to television sets in one of two ways. The most common is for the consumer to route his CATV or antenna signal through the appliance and then on to the TV via coaxial cable. A transfer switch inside the appliance will select either the broadband input or the internal channel 3/4 modulator to be connected to the TV. The other common method is to use the baseband video and audio outputs of the appliance and connect to corresponding inputs on the TV.

There are aspects of modern life that are ignored in these schemes. Many homes have more than one video appliance. Connecting more than one video appliance to a TV is not a straightforward matter. Additionally, most homes in the United States have more than one TV.

For years a small marketplace of video accessories has existed to distribute either the baseband video/audio or the channel 3 RF from multiple appliances to several TVs. These video accessories typically suffer from two problems. One problem is that the selector boxes are often confusing to use. The consumer must select the video appliance from the switch box, be sure that the video appliance has its ANT/VCR switch in the proper position, and turn the TV to channel 3. The selection of appliance often will be different in the room where the appliances are located. The second problem that switch boxes do not address is the need for control of the appliances at the remote television. There is a secondary market of IR signal repeating devices that will accept IR control signals in one room of a house and transmit them via wires or radio waves to a second device positioned near the appliances. These signals are turned into IR pulses that duplicate the originals, which allows the consumer to start and stop the VCR, or to change satellite channels.

Devices exist that address these problems in a unified fashion. For years professional satellite installers have been installing external video modulators to these appliances. These modulators have channel assignments that are programmable by the installer. Correct use of these devices would remove switches entirely from this system, and instead would create new TV channels where there were none. In a typical house, coaxial cable from all TVs is run to a central location. The broadband CATV (antenna) signal is then split to all of the TVs in the house and amplified if needed. The broadband signal is also combined with new channels that contain the video programming from the VCR and other video appliances. Any TV in the house can watch the broadcast channels normally, or watch the VCR by tuning to the VCR channel (or videodisc player, or satellite receiver). A properly installed system preserves the quality of all signals while greatly enhancing the convenience of use.

Also available with this type of system are add-on accessories that allow IR control signals to be transmitted along the coax cable that provides the programming. The major disadvantage of this system is the expense. These systems are all custom and professionally installed.

SUMMARY OF THE INVENTION

The present invention provides a system for distributing video signals in a home in a manner that includes all aspects of a professionally installed video system into a product that is installable and affordable by an average consumer.

Accordingly a video signal distribution system according to the invention comprises an interface device and video signal input means for receiving TV signals on broadcast channels connected to the interface device. The system further includes a video appliance connected to the interface device and a television set connected to the interface device. The TV set has means associated therewith for receiving infrared control signals and forming corresponding electrical control signals. The interface device includes means for receiving the electrical control signals and using the electrical control signals to control operation of the video appliance and the video signal input means. The interface device includes an amplifier circuit having its input terminal isolated from its output so that signals that appear at the output of the amplifier are not transmitted to its input. Therefore, the interface device eliminates the need for a switch as used in conventional systems to provide the required isolation between video signal sources.

The video signal distribution system according to the invention may further comprise a plurality of TV sets connected to the interface device, and means associated with each of the plurality of TV sets for receiving infrared control signals and forming corresponding electrical control signals.

The video signal distribution system according to the invention may further comprise a plurality of video appliances and a plurality of television sets connected to the interface device with the TV sets being remote from the plurality of video appliances. The interface device includes means for receiving the electrical control signals corresponding to a selected TV set and directing electrical control signals to a selected one of the plurality of video appliances to provide video signals to the television sets.

An appreciation of the objectives of the present invention and a more complete understanding of its structure and method of operation may be had by studying the following description of the preferred embodiment and by referring to the accompanying drawings.

DESCRIPTION OF THE PREFERRED EMBODIMENT

Figure 1:
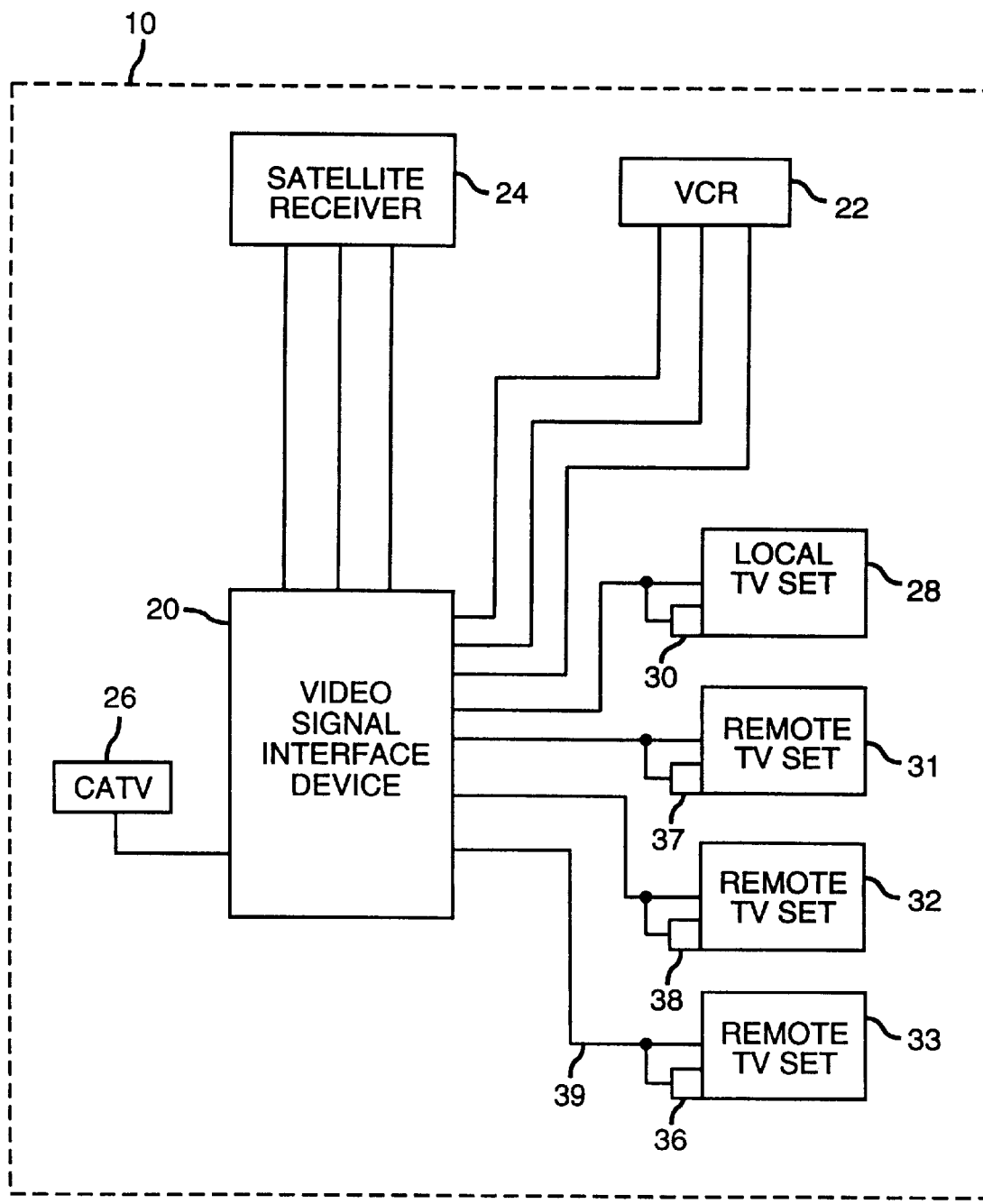
FIG. 1 is a block diagram of a video signal distribution system according to the invention.

Referring to FIG. 1, the present invention comprises an integrated system 10 for distribution of video signals and control of the video appliances in a single device. An interface device 20 routes video and control signals within the system 10. The interface device 20 may be placed near a video cassette recorder (VCR) 22 and a satellite receiver 24. The video signal distribution portion of the interface device 20 includes an RF input for connection to a CATV source 26 or an antenna (not shown), and outputs for a local TV set 28 that includes an IR target 30. The interface device may also be connected to a plurality of remote TV sets 31–33 that are typically in other rooms remote from the local TV set 28, the VCR 22 and the interface device 20. The number of remote TV sets is merely an example of a typical installation and in no way limits the scope of the invention.

Figure 2:
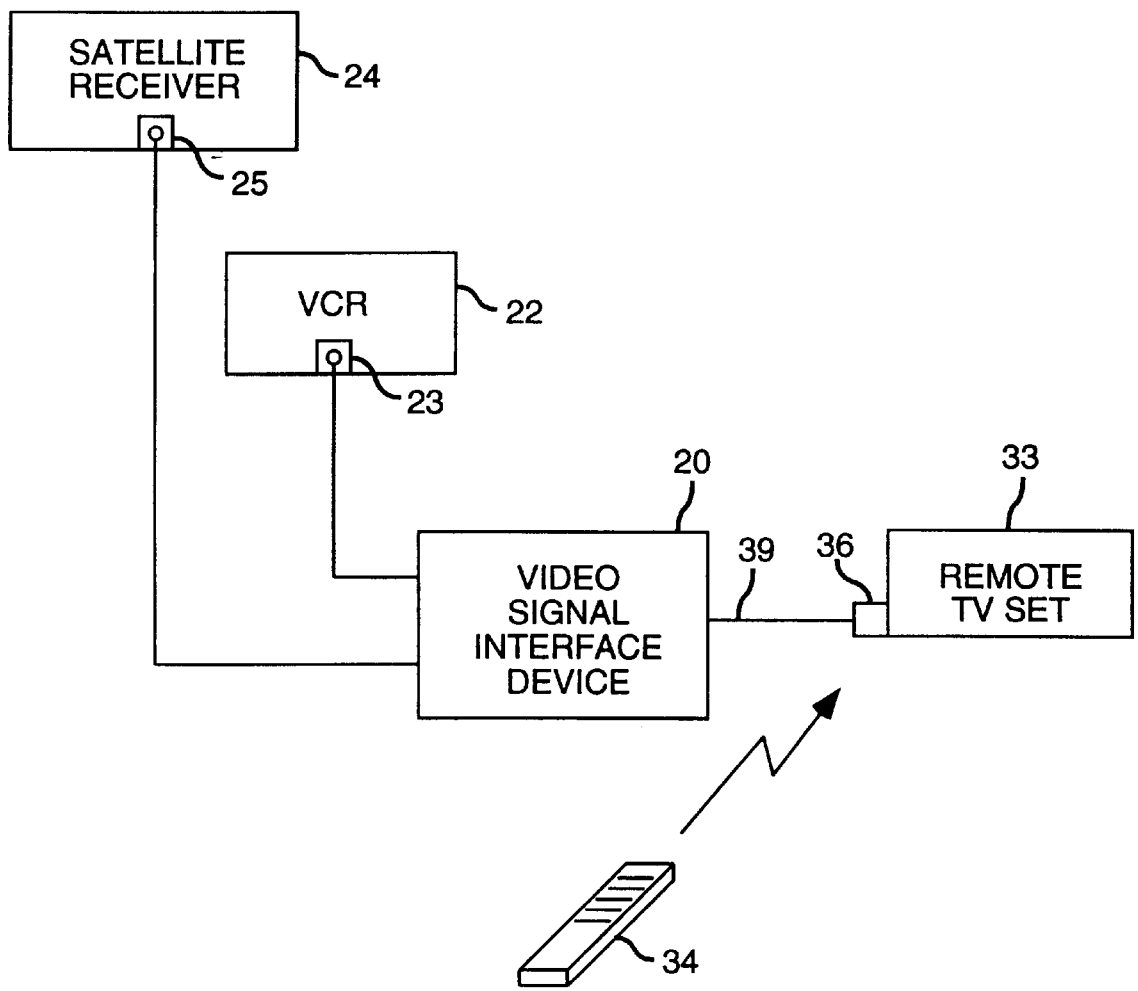
FIG. 2 is a block diagram of an infrared control system that may be used with the video signal distribution system of FIG. 1.

Referring to FIGS. 1 and 2, the video signal distribution system includes two sets of video/audio inputs for the video appliances. As shown in FIG. 2, the front of the VCR 22 includes an IR repeater/emitter 23, and the front of the satellite receiver 24 includes an IR repeater/emitter 25. Both the VCR 22 and the satellite receiver 24 are connected to the interface device 20 via cables. Connecting all TVs in the house via coaxial cables allows the user to tune to anything on the CATV (or ant) feed, or tune either the VCR or satellite receiver (DSS) channels.

The VCR and satellite receiver channels are programmable to allow the user to avoid existing broadcast channels. An IR target 36 is placed adjacent the remote TV set 33. A standard remote control device 34 is used to direct IR signals to the target 36. The remote TV set 31 may be tuned to the channel assigned to the VCR 22 for viewing. The IR signals are then transmitted to the VCR 22 to START, STOP, PAUSE, etc. the VCR 22.

By aiming the remote control device 34 at the IR target 36, the user can control video appliances that are in another room. The only connection between the remote TV set 33 and the interface device 20 is the coaxial cable 39.

Figure 3:
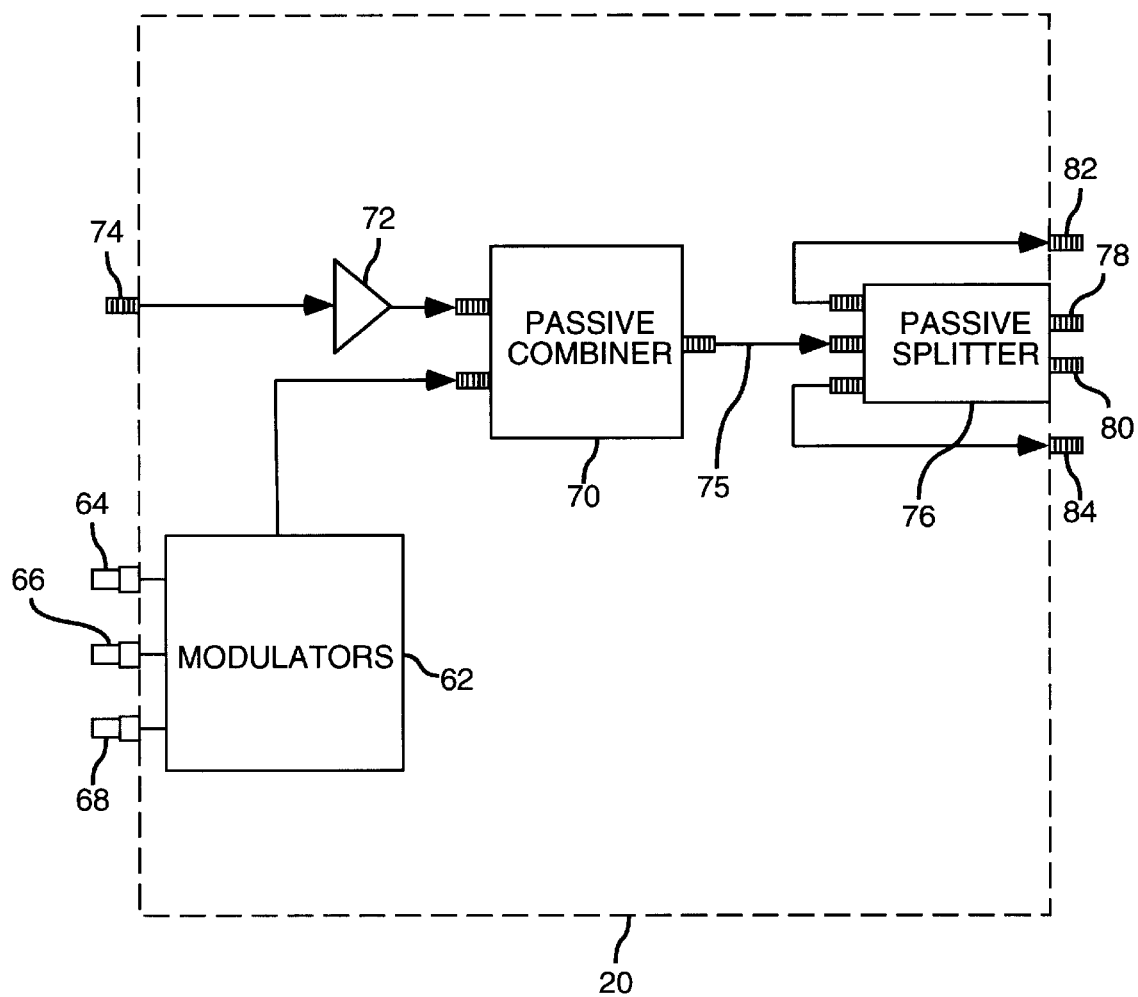
FIG. 3 is a block diagram of a video interface device that may be included in FIG. 1.

FIG. 3 shows components that may be included in the interface device 20 of FIGS. 1 and 2. Referring to FIG. 3, a video interface device 20 includes a modulator module 62 that has a pair of external inputs 64 and 66 for audio signals and an input 68 for video signals. The inputs 64, 66 and 68 are suitable for connection to an external device such as a video cassette recorder, video disc player, satellite receiver, CCTV camera, etc. The modulator module 62 includes one or more video modulators that are NTSC compatible. The modulators preferably have 4.5 MHz double sidebands. The modulators preferably are frequency agile such that an installer may select a carrier frequency within either the frequency band of 400 to 600 MHz or 600 to 800 MHz.

The modulator module 62 produces an output signal that is input to a passive signal combiner 70. The passive signal combiner 70 also receives an input from an RF amplifier 72 that receives signals at an input jack 74 from a video signal source such as CATV (not shown) or a VHF/UHF antenna F-connector (not shown). The RF amplifier 72 compensates for splitter/connector losses and provides isolation for the CATV/antenna input 74. The passive signal combiner 70 combines the signals input thereto and provides a combined output on a single conductive path 75.

The combined signals from the various video signal sources that are input to the modulator module 62 and the RF amplifier 72 are then input to a passive signal splitter 76. The passive signal splitter 76 provides the combined signals to a pair of output jacks 78 and 80 that are suitable for connection to a TV set (not shown) or to a VCR (not shown). The passive signal splitter 76 also provides the combined signals to a pair of F-connectors 82 and 84. The combined signals at the outputs 78, 80, 82 and 84 appear at a maximum of 15.5 dB/mV.

Figure 4:
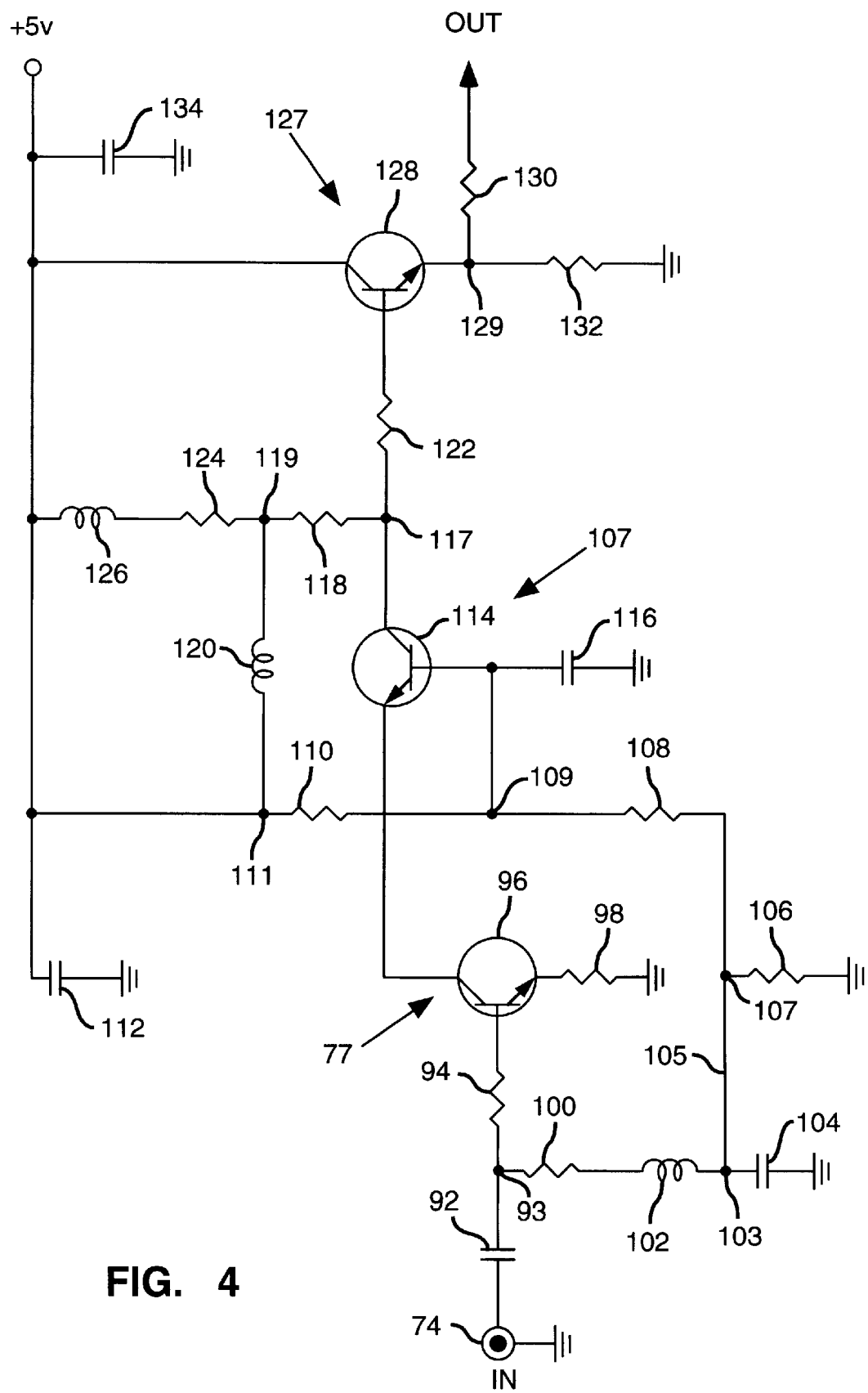
FIG. 4 is a schematic diagram of circuitry that may be included in the video interface device of FIG. 3.

Referring to the schematic diagram of FIG. 4, the RF amplifier 72 includes a capacitor 92 connected between the input jack 74 and a junction 93. The capacitor 92 preferably has a capacitance of about 470 pF. A first resistor 94 is connected between the junction 93 and a transistor 96. The resistor 94 preferably has a resistance of about 39 Ω. The transistor 96 and associated circuitry forms a common emitter stage 77. Accordingly, the emitter of the transistor 96 is connected to ground through a resistor 98 that has a resistance of about 10 Ω.

A second resistor 100 has a first terminal connected to the junction 93. An inductor 102 is connected to the other terminal of the resistor 100. The RF amplifier 72 preferably is formed on a printed circuit board (not shown), and the inductor 102 preferably is formed as a printed inductor such that an inductance of about 22 nH appears in the conductive path between the resistor 100 and a junction 103. Forming an inductor directly on a printed circuit board is an inexpensive technique for providing a small inductance. A capacitor 104 having a capacitance of about 470 pF is connected between the junction 103 and ground. A conductor 105 connects the junction 103 to a junction 107, which is connected to ground through a resistor 106 so that the resistor 106 and the capacitor 104 are connected in parallel. The resistor 106 preferably has a resistance of about 270 Ω.

A resistor 108 is connected between the junction 107 and a junction 109. The resistor 108 preferably has a resistance of about 240 Ω. A resistor 110 is connected between the junction 109 and a junction 111, which is connected to a 5 volt DC supply. The resistor 110 preferably has a resistance of about 470 Ω. The junction 111 is also connected to ground through a capacitor 112. The capacitor 112 preferably has a capacitance of about 0.1 μF. A 5 volt DC source is connected to the capacitor 112 and to a capacitor 134 that is also grounded. The capacitor 134 preferably has a capacitance of about 0.1 μF.

A second transistor 114 is arranged as a common base stage 107. The base of the transistor 114 is connected to the junction 109 so that the base is connected to the resistor 108. The base of the transistor 114 is also connected to ground through a by-pass capacitor 116 that has a capacitance of about 470 pF. The emitter of the transistor 114 is connected directly to the collector of the transistor 96. The collector of the transistor 114 is connected to a junction 117 to which a pair of resistors 118 and 122 are connected. The resistors 118 and 122 preferably have resistances of about 27 and 51 Ω respectively.

The resistor 118 is connected between the junction 117 and a junction 119. An inductor 120 preferably having an inductance of about 560 nH is connected between the junctions 119 and 111, which is connected to the +5V DC supply and to the resistor 110. The inductor 120 is thus connected between the resistors 110 and 118. A resistor 124 has one terminal connected to the junction 119 and the other terminal connected to a first terminal of an inductor 126. The resistor 124 preferably has a resistance of about 75 Ω. The inductor 126 is preferably a printed inductor having an inductance of about 15 nH. The other terminal of the inductor 126 is connected to the +5V DC supply so that electrical current flows from the supply source through the inductor 126 and then through the resistor 124. The resistors 118 and 124 combine with the resistor 98 to give a nominal gain of about 15 dB with the circuit loading shown.

A third transistor 128 is connected in the circuit in a common collector stage 127. The base of the transistor 128 is connected to the resistor 122 and its collector connected to the +5V DC supply. The three transistors 96, 114 and 128 may be identical 85633 transistors, which are commercially available. The emitter of the transistor 128 is connected to a junction 129. A resistor 132 having a resistance of about 100 Ω is connected between the emitter of the transistor 128 and ground. A resistor 130 having a resistance of about 33 Ω has a first terminal connected to the junction 129. The output signal of the RF amplifier 72 is taken across the other terminal of the resistor 130 and ground.

The RF amplifier 72 is formed to allow the CATV/ANT output signals and signals output from other video signal sources (video disc player, VCR satellite receiver, CCTV camera, etc.) to be connected to the combiner 70 without a switch being included in the circuit. Prior art techniques for connecting such devices to a TV set include a switch so that no signal from the satellite receiver, for example, is input to the CATFV cables. The RF amplifier 72 has a large reverse loss of about 65 dB, which effectively isolates the CATV/ANT input from other video signal sources. The RF amplifier 72 preferably has a forward gain of about 15 dB. The transistor 96 provides forward gain while the transistor 114 provides isolation (reverse loss) to prevent RF signals from propagating from the output to the input of the RF amplifier 72. The transistor 128 is connected as a buffer.

The interface circuit included in the present invention has significant advantages. Because it includes only the three transistors 96, 114 and 128, the interface circuit is inexpensive, particularly when the performance specifications are considered. The 15 dB forward gain plus the 65 dB reverse loss result in a figure of merit of eighty, which is unusually high for a three transistor circuit. The performance specifications are achieved by the series combination of the common emitter stage 77, followed by the common base stage 107, followed by the common collector stage 127. A typical prior art amplifier having a figure of merit of eighty would include twice the number of transistor stages. The transistor 96 and 114 are in series with respect to DC and operate at 40 mA, which has to be taken from the power supply only once to operate the two transistors 96 and 114.

The common emitter stage provides a uniform impedance of 75 to the input terminal 74. This impedance is achieved by the matching network of the resistor 100 and inductor 102 connected in parallel with the resistor 94 and the emitter diffusion capacitance of the transistor 96. The transconductance of the common emitter stage 77 is set at 100 milliMho by selecting the resistor 98 to have a value of about 10 Ω.

An out of phase signal is coupled back to the input by the collector-base feedback capacitance and multiplied by the gain of the common emitter stage 77. By minimizing effects of this parasitic Miller capacitance, the circuit maximizes the gain-bandwidth product. This is done by reducing the voltage gain of the common emitter stage 77 via a low load impedance. The input impedance of the common base stage 107 is the load on the transistor 96 and is about one ohm. The inductor 126 is connected to the collector of the transistor 114. The inductor 126 increases the impedance of the collector load on the transistor 114 at high frequencies to compensate for parasitic capacitance. The inductor 126 preferably has a value that makes the frequency response of the circuit flat to several hundred MHz. The resistors 118 and 124 provide a combined resistance of about 100 Ω at the collector of the transistor 114. The signal output from the transistor 114 is at the node 117 and is an amplified replica of the input without the Miller effect.

The common emitter configuration of the transistor 96 together with the transistor 114 provides most of the forward gain in the circuit 72. The common base configuration of the transistor 114 provides most of the reverse loss in the circuit without reducing the forward gain. The common collector configuration of the transistor 128 provides impedance matching to match the circuit 72 to the load, which typically is about 50 Ω.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A video signal distribution system including a video amplifier circuit having an input terminal connected to a video signal source and an output connected to a signal combiner that is arranged to receive signals from a video appliance, the signal combiner being arranged to provide signals input thereto to a television set, comprising:

a first transistor circuit arranged to receive video signals from the video signal source, the first transistor circuit including a first transistor circuit connected in a common emitter configuration with its base connected to an input terminal of the video amplifier circuit and arranged to provide a predetermined forward gain in signals input thereto such that signals output from the video amplifier circuit have amplitudes suitable for input to the television set;

a second transistor circuit including a second transistor arranged in a common base configuration and having its emitter connected to the collector of the first transistor, the second transistor being arranged to provide a predetermined reverse loss to prevent transmission of RF signals from the video amplifier output to its input; and a third transistor circuit connected to the second transistor circuit and including a third transistor arranged in a common collector configuration to provide an impedance transformation such that the video amplifier has a predetermined output impedance at the emitter of the third transistor.

2. The video amplifier circuit of claim 1, further including a resistive-inductive network connected to the second transistor to compensate for the parasitic capacitance effects.

3. A video signal distribution system for providing video signals from a broadcast source and a video appliance to a TV set, comprising:

a modulator arranged for connection to the video appliance;

a signal combiner arranged to receive signals output from the modulator; and an RF amplifier having an input terminal connected to receive VHF/UHF TV signals from the broadcast source and having an output connected to the signal combiner, the RF amplifier having a reverse isolation sufficient to eliminate the need for a transfer switch to prevent transmission of RF signals from the signal combiner from reaching the RF amplifier, the RF amplifier comprising:

a first transistor arranged in a common emitter configuration with its base connected to the input terminal and arranged to provide a predetermined forward gain in signals input thereto and output to the signal combiner;

a second transistor arranged in a common base configuration and having its emitter connected to the collector of the first transistor, the second transistor being arranged to provide a predetermined reverse loss to prevent transmission of RF signals from the RF amplifier output to its input; and a third transistor arranged in a common collector configuration connected to the second transistor and arranged to provide an impedance transformation such that the RF amplifier has a predetermined output impedance.

4. The video signal distribution system of claim 3, further including a signal splitter connected to the signal combiner to receive video signals therefrom and divide them between a plurality of video output terminals.

5. The video signal distribution system of claim 3, further including a resistive-inductive network connected to the second transistor to compensate for parasitic capacitance effects.

* * * * *